US009466974B2

(12) United States Patent
Hsieh et al.

(10) Patent No.: US 9,466,974 B2
(45) Date of Patent: Oct. 11, 2016

(54) SYSTEMS AND METHODS FOR INDUCTIVE OVERVOLTAGE PROTECTION OF PFC BULK CAPACITORS IN POWER SUPPLIES

(71) Applicants: Ya-Tang Hsieh, Taipei (TW); Tsung-Cheng Liao, Taoyuan (TW); Chang Yung Chang, New Taipei (TW); Chi-Hua Lin, New Taipei (TW); Wei Cheng Yu, Taiwan (TW)

(72) Inventors: Ya-Tang Hsieh, Taipei (TW); Tsung-Cheng Liao, Taoyuan (TW); Chang Yung Chang, New Taipei (TW); Chi-Hua Lin, New Taipei (TW); Wei Cheng Yu, Taiwan (TW)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 14/265,915

(22) Filed: Apr. 30, 2014

(65) Prior Publication Data

US 2015/0318685 A1 Nov. 5, 2015

(51) Int. Cl.
*H02H 7/125* (2006.01)
*H02H 7/20* (2006.01)
*H02H 7/16* (2006.01)
*G06F 1/30* (2006.01)
*H02H 3/05* (2006.01)

(52) U.S. Cl.
CPC ............... *H02H 7/125* (2013.01); *G06F 1/30* (2013.01); *H02H 7/1252* (2013.01); *H02H 7/16* (2013.01); *H02H 7/20* (2013.01); *H02H 3/05* (2013.01)

(58) Field of Classification Search
CPC .... H02H 7/1252; H02H 7/1213; H02H 7/20; H02M 1/32; G06F 1/26
See application file for complete search history.

(56) References Cited

U.S. PATENT DOCUMENTS

| 5,784,231 | A | * | 7/1998 | Majid | H02H 7/1213 361/18 |
|---|---|---|---|---|---|
| 7,315,461 | B2 | * | 1/2008 | Kyono | H02M 1/32 323/907 |
| 8,194,419 | B2 | * | 6/2012 | Ryu | H02M 1/4208 363/21.04 |
| 2012/0154967 | A1 | | 6/2012 | Hong | |
| 2013/0156459 | A1 | * | 6/2013 | Kawakatsu | H02M 1/10 399/88 |
| 2013/0279219 | A1 | * | 10/2013 | Oki | H02M 1/32 363/53 |
| 2015/0085540 | A1 | * | 3/2015 | Huang | H02H 7/1213 363/56.11 |

FOREIGN PATENT DOCUMENTS

CN 103066574 4/2013

OTHER PUBLICATIONS

Verdun, "DC-Powered System Side Control of AC-DC Adapter Primary Side Switching Circuitry", U.S. Appl. No. 14/082,592, filed Nov. 18, 2013, 48 pgs.

\* cited by examiner

*Primary Examiner* — Matthew Nguyen
(74) *Attorney, Agent, or Firm* — Egan, Peterman, Enders & Huston LLP

(57) ABSTRACT

Systems and methods are provided that may be implemented for overvoltage protection of bulk capacitors employed in power factor correction (PFC) circuitry components of switched mode power supply units (PSUs) using one or more inductive overvoltage feedback protection paths (OVPs) to monitor a voltage indicative of a PFC bulk capacitor by sensing the real time voltage at one or both of the primary and/or secondary side windings of a PSU transformer, and/or using an auxiliary windings of a PSU transformer.

25 Claims, 7 Drawing Sheets

SYSTEMS AND METHODS FOR INDUCTIVE OVERVOLTAGE PROTECTION OF PFC BULK CAPACITORS IN POWER SUPPLIES

FIELD OF THE INVENTION

This invention relates generally to power supplies and, more particularly, to overvoltage protection for power factor correction (PFC) bulk capacitors in power supplies.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

External AC-DC adapters or power supplies are commonly employed to convert alternating current (AC) wall current to direct current (DC) for powering DC-powered systems, including DC-powered information handling systems such as notebook computers. Power-factor correction (PFC) control schemes have been developed for AC-DC power supplies to comply with the EN61000-3-2 international standard for limiting harmonic current emissions in input line currents. Among these schemes are active PFC techniques for single-phase boost converters.

Power supplies for relatively low power electronic products that consume less than 250 Watts of power (e.g., such as AC-DC adapters for notebook computers, lighting and LCD monitors, etc.), need additional PFC techniques to maintain low harmonic distortion of the input line current. Typically, continuous conduction-mode (CCM) is not used in such low power electronic products because a relatively large inductor is required to maintain operation in CCM. The critical-conduction-mode (CRM) of operation has several advantages to CCM, such as use of a smaller sized inductor that allows reduced PCB area, decrease of inductor current to zero during turn-off time can result in zero-current-switching (ZCS) to increase efficiency, etc. Thus, CRM has been widely applied for low power electronic products rather than CCM.

Bulk capacitors have been employed with feedback in conventional PFC/PWM stage circuitry of power supplies to maintain a relatively high and substantially constant output voltage (e.g., such as 400 volts DC) to the primary windings of the main transformer of the power supply. FIG. 1 illustrates a DC-powered information handling system 104 (e.g., such as a notebook computer) that is coupled by a DC power connection 130 to conventional AC-DC adapter system 102. AC-DC adapter 102 is configured to receive AC mains power supply 101 and to convert the provided AC power to DC power that is provided to DC-powered information handling system 104 via DC power connection 130. AC-DC adapter 102 of FIG. 1 is configured to be removably and/or temporarily connected to supply DC power across DC power connection 130 to DC-powered information handling system 104 via a removable power plug interconnect 170 that mates with a corresponding power socket interconnect 172 of the DC-powered information handling system 104 that allows repeated coupling and decoupling or physical separation of the interconnects and power connection by a user. In FIG. 1, DC-powered information handling system 104 includes a system load 156 (such as CPU and other processors, display, disk drive/s, wireless communication circuitry, etc.) that is powered by DC power provided through power switching circuitry 154 from AC-DC adapter 102 and/or battery system 152 which is typically a smart battery system. System load 156 of DC-powered information handling system 104 is typically contained within a chassis enclosure, and the circuitry of AC-DC adapter 102 is typically contained within an adapter housing, such as a molded plastic enclosure.

As shown in FIG. 1, AC-DC adapter 102 includes primary mains switcher circuitry 108 and secondary side circuitry 110. Primary mains switcher circuitry 108 is controlled by combination controller 105 (combined PFC and pulse width modulation "PWM" controller) to control supply of AC current from AC mains power supply 101 (e.g., 110/120 or 220/240 AC volts or other AC mains voltage) to primary side of transformer circuitry 112. Transformer circuitry 112 includes primary and secondary side windings that provide voltage isolation between the primary and secondary sides as well as operate to provide a voltage step down (e.g., from 110/200 Volts to 19 Volts or other suitable step down voltage for system 104) for the secondary side power. DC powered information handling system 104 includes power switching circuitry 154 that is coupled as shown to control flow of current between adapter 102, battery 152, and system load 156 of DC-powered information handling system 104. Specifically, power switching circuitry 154 may switch the system load 156 between DC output 130 of AC-DC adapter 102 and battery 152, e.g., according to whether or not DC output power 130 is currently available to power system load 156.

In FIG. 1, AC-DC adapter 102 includes feedback regulator circuitry 118 that is controlled by a controller and that is coupled to receive and monitor DC voltage present on the secondary (DC) side of transformer 112, and to provide an optical switcher control signal 128 across an optocoupler 114 to control operation of primary side switcher circuitry 108 of AC-DC adapter 102. As shown, feedback regulator 118 monitors secondary voltage of DC output 130 from output feedback voltage sense line 122 and sends control signals over optocoupler 114 to the combination controller 105 of primary side switcher circuitry 108 to maintain the DC output 130 in the desired voltage range by using an On/Off signal transmitted to PFC and PWM stage circuitry 103 of primary side switcher circuitry 108 which is duty cycle controlled in such a manner so as to achieve the desired output voltage. In this regard, combination controller 105 is coupled to receive the switcher control signal 128 across the isolation barrier formed by optocoupler 114, and to respond to the switcher control signal by controlling operation of primary switcher side circuitry 108, e.g., by enabling or disabling pulse width modulation (PWM) switching operations of the switcher side circuitry 108 to turn it on or off, respectively.

Also shown in FIG. 1, is power factor correction (PFC) and pulse width modulation (PWM) stage circuitry 103 that is controlled by combination controller 105. PFC/PWM stage circuitry 103 may include inductor, Mosfet and Diode components that are operated to perform the function of power factor correction. PFC/PWM stage circuitry 103 also typically includes a bulk capacitor to maintain a substantially constant output voltage (e.g., about 400 Volts DC) on the high voltage side to the primary windings of the main transformer 112. As shown, controller 105 directly monitors output voltage of PFC/PWM stage circuitry 103 using a first resistive overvoltage protection feedback path (OVP1) 106 that is a voltage divider including four resistors 1-4 that are coupled in series between ground and the bulk capacitor of the PFC/PWM stage circuitry 103, with a feedback voltage detect pin of controller 105 coupled at a measurement node between the first and second resistors from ground to monitor a voltage value or signal indicative of the voltage on the bulk capacitor at the measurement node for comparison to a trigger voltage threshold value. There are two sensing voltage levels of controller 105 (pin connects), for example, 2.5 Volts being general regulation voltage, and 2.75 Volts being the OVP1 trigger voltage threshold level, referring to the divided voltage in voltage divider 106 from the bulk capacitor. Controller 105 only monitors divided voltage and uses a comparator to determine when the divided voltage exceeds the OVP1 trigger voltage threshold.

Combination controller 105 uses this voltage comparison to control output voltage of PFC/PWM stage 105. In this regard, when voltage at the controller feedback voltage pin of controller 105 is detected to exceed the trigger voltage threshold, the combination controller 105 will immediately turn off both PFC/PWM functions of stages 103 to prevent damage to the relatively high voltage PFC bulk capacitor, which may leak electrolyte fluid when damaged. In normal operation, the trigger voltage threshold value for OVP1 shutdown is set lower than the breakdown voltage of the PFC bulk capacitor. When the trigger voltage threshold is exceeded, controller 105 will cause the AC-DC adapter system 102 to shut down and go into latch mode.

When a fault or other problem occurs within the feedback path of OVP1 106 (e.g., such as a short in the feedback path and/or a failure of one or more of the OVP1 resistors due to aging and/or contamination from flux during manufacture), the output voltage of PFC/PWM stage 103 will no longer be controlled since there is no information or incorrect information fed to a feedback pin connection of combination controller 105 through OVP1 106. In this event, combination controller 105 will shut down the PFC/PWM stage 103 and go into protection mode (i.e., shut down mode) to ensure over-voltage protection. A second and redundant resistive overvoltage protection feedback path (OVP2) 111 to allow combination controller 105 to monitor voltage of PFC/PWM stage 103 even when OVP1 fails, e.g., due to component aging or incorrect resistors connected to the feedback detect pin of combination controller 105. OVP2 is also a voltage divider including four resistors 1-4 coupled in series between ground and the bulk capacitor of the PFC/PWM stage circuitry 103 with controller 105 coupled to monitor voltage between the first and second resistors of OVP2 111 in a similar manner as with OVP1. However, inclusion of a second and duplicate OVP2 feedback path 111 acts to increase power consumption due to power loss across the additional resistors of OVP2 111.

SUMMARY OF THE INVENTION

Disclosed herein are systems and methods that may be implemented to achieve overvoltage protection of bulk capacitors employed in power factor correction (PFC) circuitry components of switched-mode power supply units (PSUs), such as AC-DC or DC-DC adapters in a manner that increases reliability of PFC bulk capacitors and quality of PFC circuits employing the same. The disclosed systems and methods may in one embodiment employ one or more inductive overvoltage feedback protection paths (OVPs) that are coupled to allow a processing device configured as a PFC and/or PWM controller of a PSU to respond to a voltage indicative of PFC bulk capacitor overvoltage by sensing the real time voltage (e.g., using a sense capacitor voltage or value of voltage based at least in part on the sense capacitor voltage) at one or both of the primary and/or secondary side windings of a PSU transformer, and/or using an auxiliary windings of a PSU transformer.

In one embodiment, a PSU may be provided with an inductive overvoltage feedback protection path that is implemented using an OVP sense capacitor coupled in parallel with an OVP sense winding (i.e., across the terminals of the OVP sense winding) that itself is inductively coupled to one of a primary or secondary windings of a PSU transformer. In such an embodiment, voltage on the OVP sense capacitor is proportional to voltage of a PFC bulk capacitor of the same PSU, and may be monitored to sense the occurrence of an overvoltage condition on the PFC bulk capacitor. The PFC/PWM controller may then use an internal comparator to compare this sensed voltage to a reference voltage to determine if the inductive OVP trigger threshold voltage has been exceeded, e.g., 2.5 volt may represent a normal operating general regulation voltage, and 2.75 volts may represent an inductive OVP trigger voltage threshold that is determined by comparison to a 2.75 trigger reference voltage, it being understood that any other greater or lesser value of normal operating general regulation voltage and/or inductive OVP trigger voltage threshold may be employed.

In one exemplary embodiment, a processing device may be configured as a PFC/PWM controller that is coupled to monitor PFC bulk capacitor voltage using at least one resistive OVP feedback path coupled to the PFC bulk capacitor, and using at least one additional inductive OVP feedback path coupled to monitor a voltage indicative of PFC bulk capacitor voltage at one or both of the primary and secondary side windings of a transformer of the PSU. In such an embodiment, the inductive OVP feedback path may be implemented to help ensure protection of a PFC bulk capacitor in the event that the resistive OVP feedback path becomes out of control, damaged, or otherwise suffers from inaccuracy due to any factors (e.g., such as resistor failure) that adversely affect the resistive value/s of the resistive OVP feedback path.

An inductive OVP feedback path may include an inductive sense winding that may be provided on either a primary or secondary side of PSU circuitry, and that is configured to inductively monitor voltage of the primary windings of the PSU transformer. In one embodiment, an inductive sense winding may be provided on the same side of a printed circuit board (PCB) as the PSU transformer windings, and that is opposite from the side of the PCB where discrete PSU circuitry components such as resistors of a resistive OVP feedback path are soldered to the PCB. Thus, when resistive OVP components fail due to solder flux contamination resulting from circuit manufacturing process/es, inductive OVP components mounted on the other side of the PCB will not be affected by the same solder flux contamination condition on the other side of the PCB. This increases the reliability of the redundant OVP protection provided by the inductive OVP feedback path when solder flux contamination causes failure in the resistive OVP feedback path.

In the practice of the disclosed systems and methods, one or more inductive OVP feedback paths may not only be employed to monitor a voltage indicative of a PFC bulk capacitor more reliably than a resistive OVP feedback path, but may also result in reduced power consumption when substituted for a resistive OVP feedback path, e.g., to comply with US Department of Energy (DOE), European Code of Conduct (CoC), and/or US Environmental Protection Agency (EPA) Energy Star Program. Further power saving may be realized in those embodiments where an inductive OVP feedback path is implemented on the secondary (lower voltage) side windings of a power supply transformer, rather than on the higher voltage primary side.

In one exemplary embodiment, the disclosed systems and methods for inductive OVP may be implemented with any switched-mode power supply having stable output under latch mode of output voltage increment and auxiliary power, e.g. including AC-DC and DC-DC converter topologies such as forward, flyback, half-bridge, full-bridge, push-pull, buck, boost, buck-boost, cuk, etc. Moreover, the disclosed systems and methods may be implemented in one exemplary embodiment with any power supply design that employs a PFC stage, e.g., including different types of power supply topologies such as CCM PFC circuits, CRM PFC circuits, fixed off time (FOT) mode PFC circuits, etc. Examples of suitable power supply types with which the disclosed systems and methods may be implemented include not only AC adapters, but also desktop computer (DT) power supplies that have PFC stages, including server power supplies.

In one respect, disclosed herein is a switched-mode power supply unit (PSU) system, including: transformer circuitry having a primary side winding and a secondary side winding; a primary side including at least one bulk capacitor configured to receive a power input and coupled to maintain an output voltage on the primary side winding; a secondary side including DC secondary side circuitry and the secondary side winding of the transformer, the DC secondary side circuitry being configured to receive power from the primary side through the transformer and to produce a DC power output therefrom; at least one PSU processing device coupled to control the primary side of the PSU to provide DC power to the primary side winding of the transformer; and at least one inductive overvoltage protection (OVP) feedback path coupled to the PSU processing device, the inductive OVP path being inductively coupled to the primary winding of the transformer to receive a voltage from the primary winding that is indicative of a real time voltage on the bulk capacitor.

In another respect, disclosed herein is a DC-powered information handling system, including: a DC-powered system load; and an AC-DC adapter system having AC primary side switcher circuitry configured to receive an AC power input, and a DC secondary side that receives power from the AC primary side switcher circuitry to produce a DC power output. The DC-powered information handling system may be configured to be coupled by a DC power connection to receive DC power from the DC power output of the AC-DC adapter system. The AC-DC adapter system may include: transformer circuitry having a primary side winding and a secondary side winding; primary side including the AC primary side switcher circuitry and the primary side winding of the transformer, the AC primary side switcher circuitry configured to receive the AC power input and including at least one bulk capacitor coupled to maintain an output voltage on the primary side winding; a secondary side including the DC secondary side circuitry and the secondary side winding of the transformer, the DC secondary side circuitry being configured to receive power from the AC primary side switcher circuitry through the transformer and to produce the DC power output therefrom; at least one PSU processing device coupled to control the primary side switcher circuitry to provide DC power to the primary side winding of the transformer; and at least one inductive overvoltage protection (OVP) feedback path coupled to the PSU processing device, the inductive OVP path being inductively coupled to the primary winding of the transformer to receive a voltage from the primary winding that is indicative of a real time voltage on the bulk capacitor.

In another respect, disclosed herein is a method of operating a switched-mode power supply unit (PSU) system including a primary side and a secondary side that are separated by a transformer. The method may include receiving a power input in the primary side of the PSU, the primary side of the PSU including a primary side winding of the transformer, and at least one bulk capacitor coupled to maintain an output voltage on the primary side winding; using the PSU processing device to control the primary side to provide DC power to the primary side winding of the transformer; receiving power in the secondary side of the PSU from the primary side of the PSU through the transformer, the secondary side of the PSU including a secondary side winding of the transformer and DC secondary side circuitry, the power being received in the secondary side of the PSU from the secondary winding of the transformer; producing a DC power output from the DC secondary side circuitry; and using at least one inductive overvoltage protection (OVP) feedback path to inductively receive a voltage from the primary winding of the transformer that is indicative of a real time voltage on the bulk capacitor and to provide a signal to the PSU processing device based at least in part on the value of the received voltage that is indicative of the real time voltage on the bulk capacitor.

DESCRIPTION OF ILLUSTRATIVE EMBODIMENTS

Figure 1:
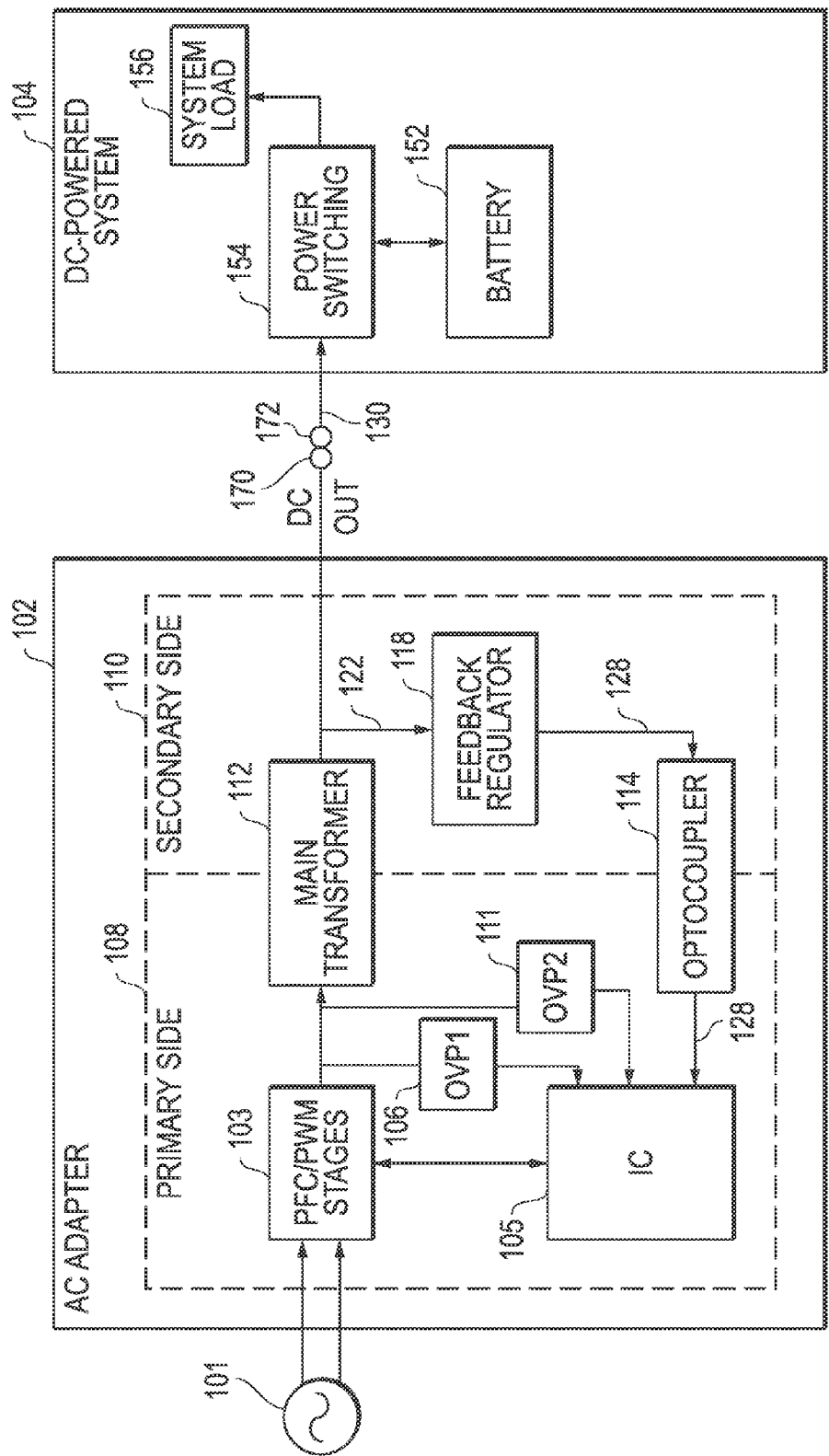
FIG. 1 is a block diagram illustrating a conventional AC-DC adapter coupled to a DC-powered information handling system.
Figure 2:
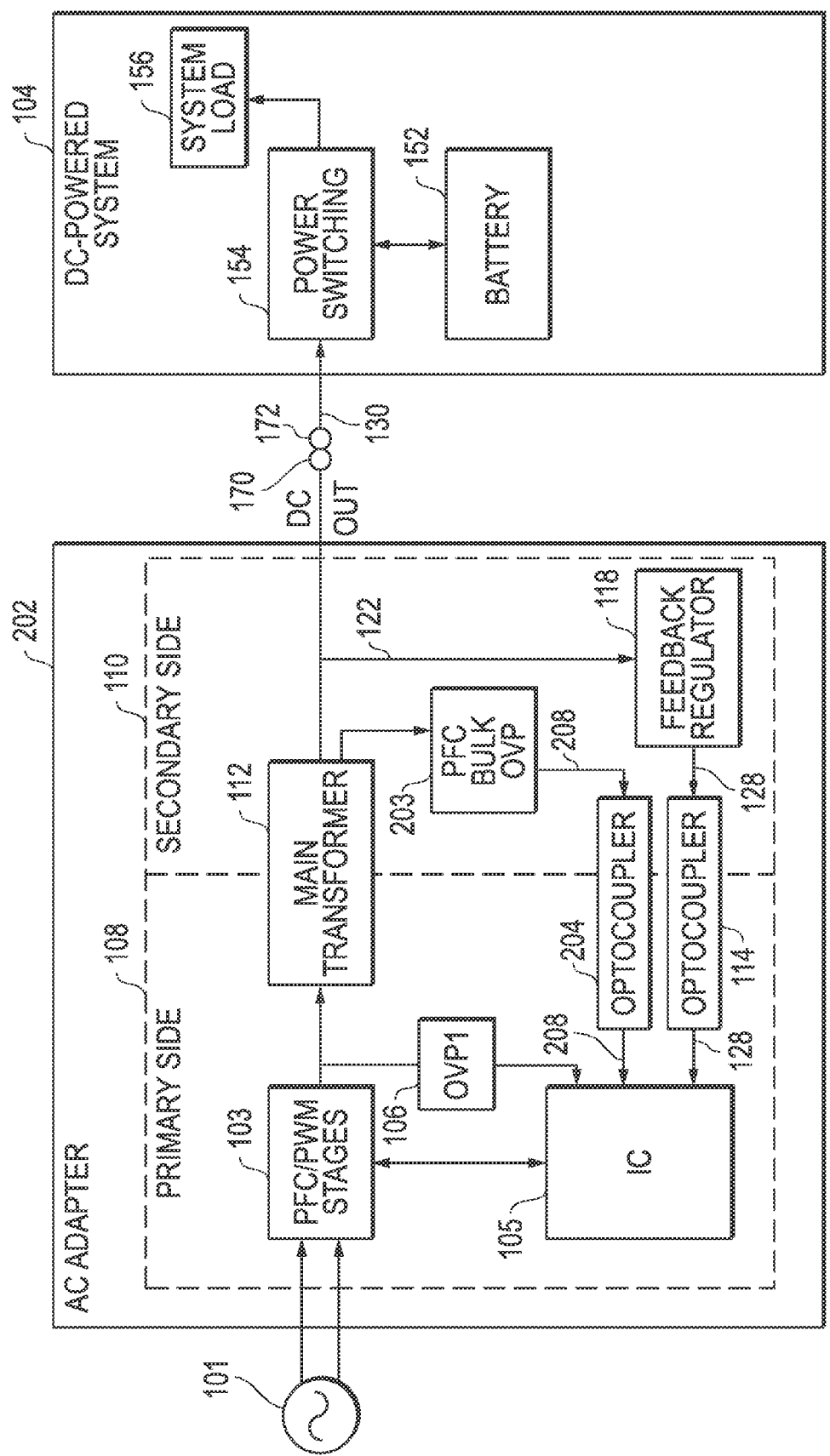
FIG. 2 is a block diagram illustrating a DC-powered information handling system coupled to a PSU according to one exemplary embodiment of the disclosed systems and methods.

FIG. 2 illustrates a DC-powered information handling system 104 (e.g., such as a notebook computer, tablet or smart phone, etc.) that is coupled by a DC power connection 130 to a swiched-mode power supply unit (PSU) configured as an AC-DC adapter system 202 according to one exemplary embodiment. Although illustrated as an AC-DC adapter system configured to supply a DC-powered information handling system, it will be understood that the disclosed systems and methods may be implemented for overvoltage protection of bulk capacitors in other types of PSUs, e.g., such as AC adapter, desktop computer power supply, server power supply, etc. Examples of other types of PSUs also include DC-to-DC adapters or conversion systems that do not include AC to DC switcher circuitry such as illustrated herein, but rather may perform voltage conversion of DC input power to DC output power of another voltage without AC to DC power conversion.

In the embodiment of FIG. 2, AC-DC adapter 202 is configured to receive AC mains power supply 101 and to convert the provided AC power to DC power that is provided to DC-powered information handling system 104 via DC power connection 130. AC-DC adapter 202 of FIG. 2 may be configured to be removably and/or temporarily connected to supply DC power across DC power connection 130 to DC-powered information handling system 104 via a removable power plug interconnect 170 that mates with a corresponding power socket interconnect 172 of the DC-powered information handling system 104 that allows repeated coupling and decoupling or physical separation of the interconnects and power connection by a user. In the embodiment of FIG. 2, DC-powered information handling system 104 includes a system load 156 (such as CPU and other processors, display, disk drive/s, wireless communication circuitry, etc.) that is powered by DC power provided through power switching circuitry 154 from AC-DC adapter 202 and/or battery system 152 which may be, for example, a smart battery system. System load 156 of DC-powered information handling system 104 may be contained within a chassis enclosure, and the circuitry of AC-DC adapter 202 may be contained within an adapter housing, such as a molded plastic enclosure. However, it is also possible that an AC-DC adapter or other type of PSU may be contained within the same chassis as an information handling system, e.g., portable information handling system such as notebook computer, tablet or smart phone; non-portable information handling system such as desktop computer; peripheral component such as LCD or LED video display; lighting circuitry, etc.

As shown in FIG. 2, AC-DC adapter 202 includes primary mains switcher circuitry 108 and secondary side circuitry 110. Primary mains switcher circuitry 108 is controlled by a PSU processing device in the form of a controller 105 (e.g., a combined PFC and PWM controller, a PWM controller, or other suitable type/s of processing device/s) to control supply of AC current from AC mains power supply 101 (e.g., 110/120 or 220/240 AC volts or other AC mains voltage) to primary side of transformer circuitry 112. Transformer circuitry 112 includes primary and secondary side windings that provide voltage isolation between the primary and secondary sides as well as operate to provide a voltage step down (e.g., from 110/200 Volts to 19 Volts or other suitable step down voltage for system 104) for the secondary side power. DC powered information handling system 104 may include power switching circuitry 154 that is coupled as shown to control flow of current between adapter 202, battery 152, and system load 156 of DC-powered information handling system 104. Specifically, power switching circuitry 154 may switch the system load 156 between DC output 130 of AC-DC adapter 202 and battery 152, e.g., according to whether or not DC output power 130 is currently available to power system load 156. Further information on configuration and operation of AC-DC adapters including primary switcher circuitry may be found, for example, in U.S. patent application Ser. No. 14/082,592, which is incorporated herein by reference in its entirety.

In the exemplary embodiment of FIG. 2, AC-DC adapter 202 includes feedback regulator circuitry 118 that is operated by a processing device (e.g., integral controller or microcontroller) and that is coupled to receive and monitor DC voltage present on the secondary (DC) side of transformer 112, and to provide an optical switcher control signal 128 across an optocoupler 114 to control operation of primary side switcher circuitry 108 of AC-DC adapter 202. As shown, feedback regulator 118 may monitor secondary voltage of DC output 130 from output feedback voltage sense line 122 and send control signals over optocoupler 114 to the controller 105 of primary side switcher circuitry 108 to maintain the DC output 130 in the desired voltage range by using an On/Off signal transmitted to PFC and PWM stage circuitry 103 of primary side switcher circuitry 108 which is duty cycle controlled in such a manner so as to achieve the desired output voltage. In this regard, controller 105 may be coupled to receive the switcher control signal 128 across the isolation barrier formed by optocoupler 114, and to respond to the switcher control signal by controlling operation of primary switcher side circuitry 108, e.g., by enabling or disabling pulse width modulation (PWM) switching operations of the switcher side circuitry 108 to turn it on or off, respectively.

Also shown in FIG. 2, is power factor correction (PFC) and pulse width modulation (PWM) stage circuitry 103 that may be controlled by controller 105, or other suitable processing device/s in other embodiments. PFC/PWM stage circuitry 103 may include inductor, Mosfet and diode components that may be operated to perform the function of power factor correction. PFC/PWM stage circuitry 103 may also include a bulk capacitor to maintain a substantially constant output voltage (e.g., about 400 Volts DC) on the high voltage side to the primary windings of the main transformer 112. Such a bulk capacitor serves to store energy for release to counteract voltage drops on the primary windings, e.g., such as may occur due to inductive power losses in circuit traces of the primary side switcher circuitry 108.

As shown in FIG. 2, controller 105 directly monitors output voltage of PFC/PWM stage circuitry 103 using a first resistive overvoltage protection feedback path (OVP1) 106 that is a voltage divider including four resistors 1-4 (e.g., R9=18.7KΩ; and R10, R11, R12=1MΩ ohm) that are coupled in series between ground and the bulk capacitor of the PFC/PWM stage circuitry 103, with a feedback voltage detect pin of controller 105 coupled at a measurement node between the first and second resistors from ground to monitor a voltage value or signal indicative of the voltage on the bulk capacitor at the measurement node for comparison to a trigger voltage threshold value. There may be two sensing voltage levels of controller 105 (pin connects to R9), for example, 2.5 Volts being general regulation voltage, and 2.75 Volts being the OVP1 trigger voltage threshold level, referring to the divided voltage received from the bulk capacitor. Controller 105 may only monitor the lower side resistor R9 and use a comparator to determine when R9 voltage exceeds the OVP1 trigger voltage threshold. Controller 105 may also use this voltage comparison to control output voltage of PFC/PWM stage 105. In this regard, when voltage at the controller feedback voltage pin of controller 105 is detected to exceed a trigger voltage threshold (e.g., of about 2.75 volts), the controller 105 may be configured to immediately turn off both PFC/PWM functions of stages 103 to prevent damage to the relatively high voltage PFC bulk capacitor, which may leak electrolyte fluid when damaged. In one embodiment, during normal operation the trigger voltage threshold value for OVP1 shutdown may be set lower than the breakdown voltage of the PFC bulk capacitor. When the trigger voltage threshold value is exceeded, controller 105 may be configured to cause the AC-DC adapter system 202 to shut down and go into latch mode.

When a fault or other problem occurs within the feedback path of OVP1 106 (e.g., such as a short in the feedback path and/or a failure of one or more of the OVP1 resistors due to aging and/or contamination from flux during manufacture), the output voltage of PFC/PWM stage 105 will no longer be controlled since there is no information or incorrect information fed to a feedback pin connection of combo controller 105 through OVP1 106. In this event, controller 105 will shut down the PFC/PWM stage 103 and go into protection mode (i.e., shut down mode) to ensure over-voltage protection.

Still referring to the embodiment of FIG. 2, a second and inductive overvoltage protection feedback path (OVP2) including OVP2 detection circuitry 203 may be provided to allow controller 105 to monitor voltage of PFC/PWM stage 105 even when OVP1 fails, e.g., due to component aging or incorrect resistors connected to the feedback detect pin of controller 105. It will be understood that in other PSU embodiments one or more inductive overvoltage protection feedback path/s may be similarly provided without the presence of a resistive OVP path, and/or that an inductive OVP path may configured as the first overvoltage protection path with a resistive OVP path configured as a secondary (or backup) overvoltage protection path.

In the exemplary embodiment of FIG. 2, detection circuitry 203 of OVP2 is inductively coupled by a secondary side sense winding to the primary winding side of PSU transformer 112. In this embodiment, detection circuitry 203 is configured to sense voltage on the secondary side sense winding that is inductively created from current on primary side winding/s of transformer 112, and therefore that is indicative of (e.g., proportional to) voltage of PFC/PWM stage 105 and primary side windings of transformer 112. OVP2 detection circuitry 203 may be further configured to provide an OVP control signal 208 optically across an optocoupler 204 or across another type of suitable isolation barrier element or circuitry (e.g., such as isolation capacitor) to controller 105 when voltage monitored at the secondary side sense winding of transformer 112 is detected by OVP2 circuitry 203 to exceed a trigger voltage threshold value of about 1.25 volts or any other voltage threshold depending on the relative operating voltage range of PFC/PWM stage 105 and the ratio of windings between primary windings of transformer 112 and sense windings coupled to OVP2 detection circuitry 503. It will be understood that OVP2 detection circuitry 203 may be implemented using any suitable analog and/or digital circuitry configuration that is suitable for monitoring a voltage indicative of PFC bulk capacitor voltage, to compare this monitored voltage to an OVP trigger voltage threshold, and to provide an OVP control signal 208 when the monitored voltage exceeds the trigger threshold voltage.

Upon receipt of an OVP control signal 208 (e.g., via analog front end of controller 105), controller 105 may be configured to immediately turn off both PFC/PWM functions of stages 103 to prevent damage to the relatively high voltage PFC bulk capacitor, which may leak electrolyte fluid when damaged. As with OVP1 circuitry 106, during normal operation the trigger voltage threshold for OVP2 shutdown may be set lower than the breakdown voltage of the PFC bulk capacitor. When the OVP2 trigger voltage threshold value is exceeded, controller 105 may be configured to cause the AC-DC adapter system 202 to shut down and go into latch mode. It will be understood that in other embodiments, it is possible that a PSU processing device (e.g., such as controller 105) may be configured to directly monitor voltage received from a secondary side inductive OVP feedback path, e.g., without the presence of a separate OVP detection circuitry 203.

Figure 3:
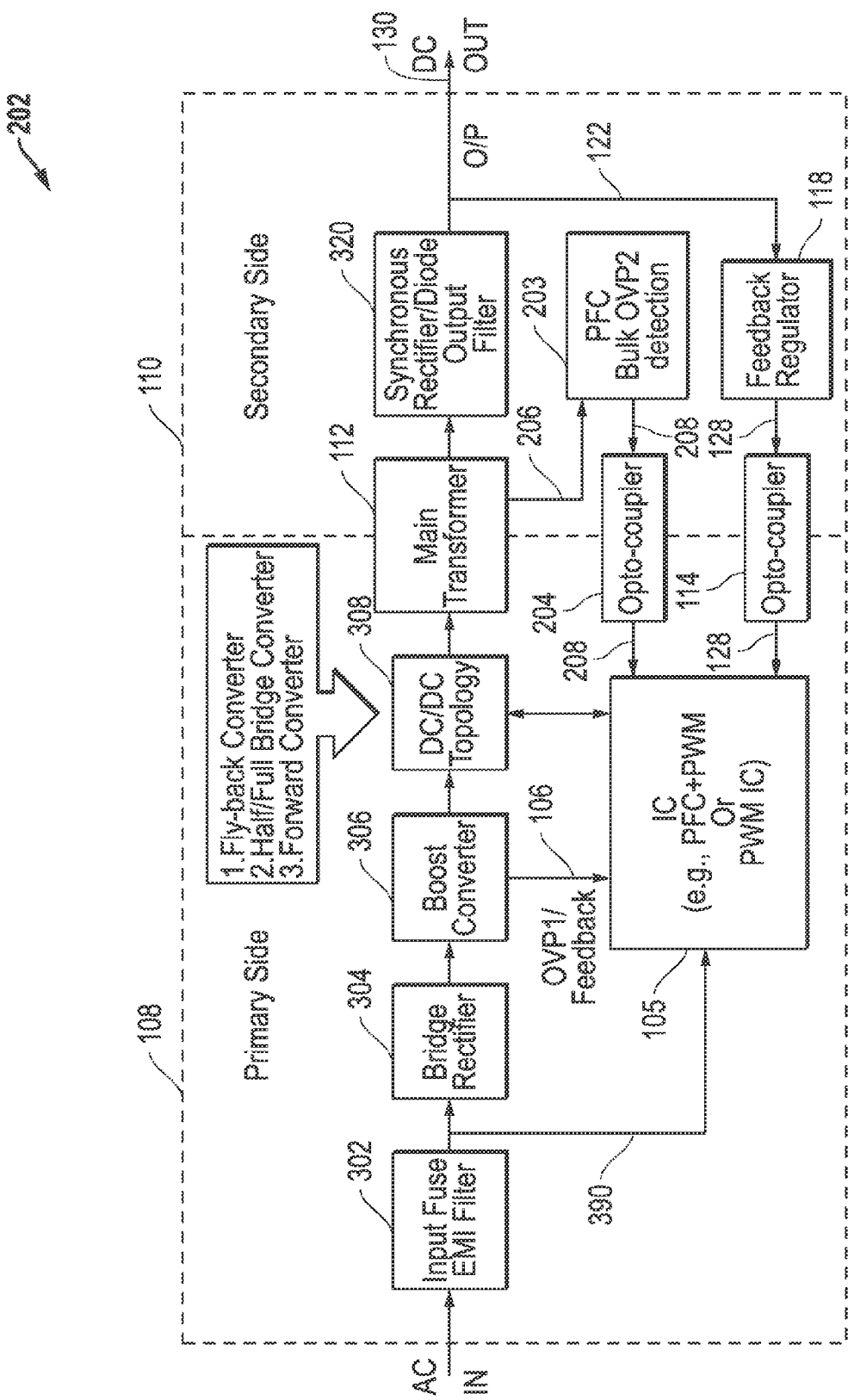
FIG. 3 is a block diagram illustrating a PSU according to one exemplary embodiment of the disclosed systems and methods.

FIG. 3 illustrates a block diagram of one exemplary embodiment of AC-DC adapter system 202 as it may be configured with a secondary side inductive OVP2 circuitry 203 such as illustrated in FIG. 2. As shown in FIG. 3, primary side 108 of AC-DC adapter system 202 includes input fuse EMI Filter circuitry 302 that is coupled to receive input AC power, e.g., from AC mains 101. Bridge rectifier 304 is coupled as shown between input fuse EMI Filter circuitry 302 and DC-DC boost converter 306. Resistive OVP1 path 106 is provided as shown from boost converter 306 to controller 105. Controller 105 is also coupled by monitoring path 390 at a node between input fuse EMI Filter circuitry 302 and boost converter 306 for purposes of monitoring open circuit or short circuit condition in the input current path of primary side 108, e.g., to allow controller 105 to shut down or otherwise alter operation of AC-DC adapter system 202 based on input current condition. Also shown are DC/DC topology components 308 (e.g., fly-back converter, half/full bridge converter, forward converter) which provide power to primary side windings of main transformer 112.

Still referring to FIG. 3, secondary side 110 of AC-DC adapter system 202 includes secondary windings of main transformer 112 which supply output power to synchronous rectifier/diode output filter components 320 that supply DC output (O/P) 130. Feedback regulator circuitry 118 is coupled to monitor DC output 130 as shown and configured to provide optical switcher control signal 128 across optocoupler 114 to controller 105 as previously described. Also shown in FIG. 3 is overvoltage protection (OVP2) detection circuitry 203 that is coupled to secondary side sense windings within main transformer 112 via voltage sensing path 206. As previously described, OVP2 detection circuitry 203 may be configured to inductively sense voltage via voltage sensing path 206 that is indicative of primary side PFC bulk capacitor voltage within boost converter 306 using secondary side sense windings that are inductively coupled to primary windings of transformer 112. In this regard, OVP2 detection circuitry 203 may be further configured to provide OVP control signal 208 across optocoupler 204 to controller 105 when voltage monitored at the secondary side sense windings of transformer 112 is detected by OVP2 detection circuitry 203 to exceed the trigger voltage threshold value. As previously described, controller 105 may be configured in one embodiment to immediately turn off both PFC/PWM functions of stages 103 upon receipt of the OVP control signal 208.

Figure 4:
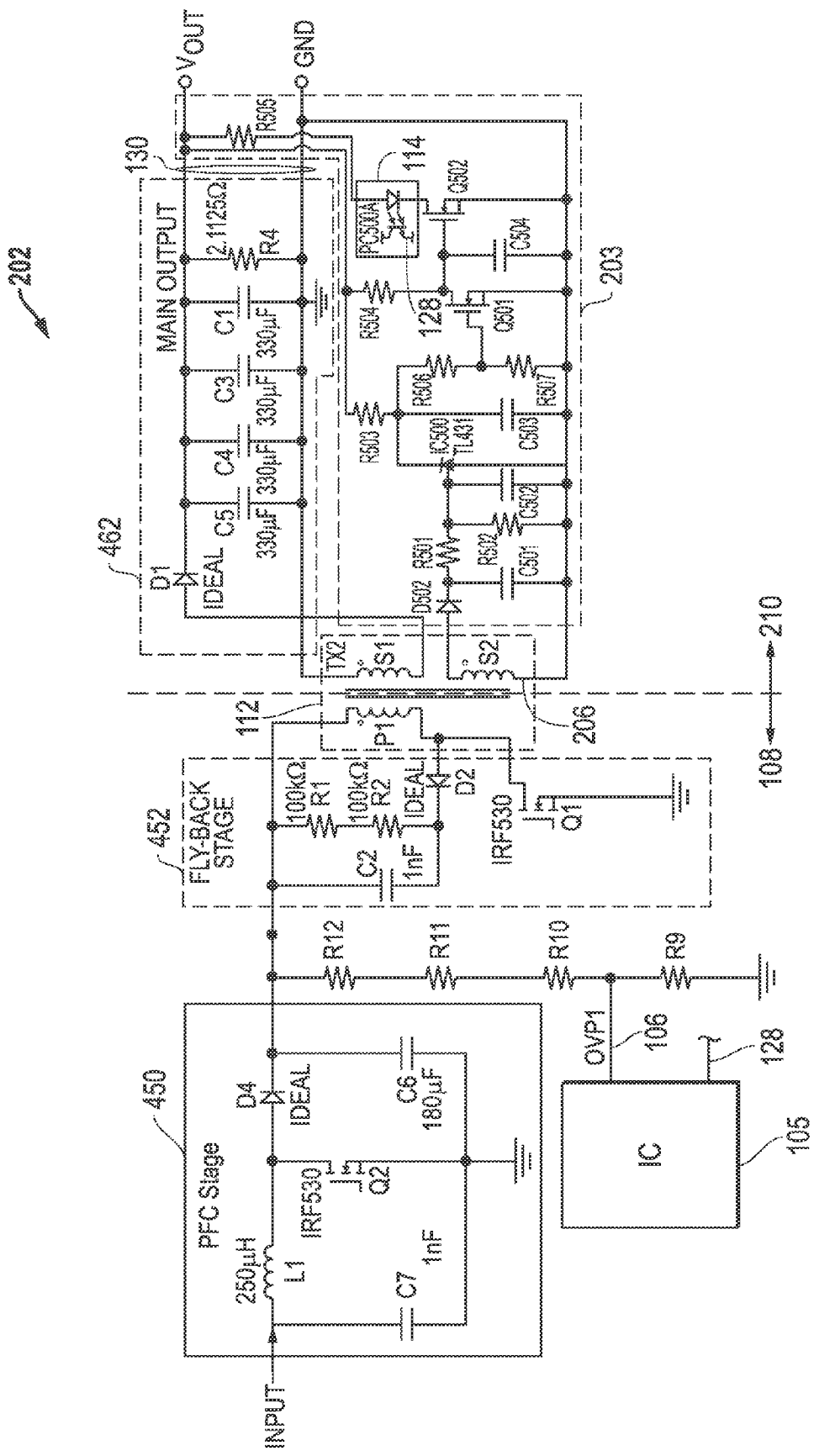
FIG. 4 is a simplified schematic illustrating a PSU according to one exemplary embodiment of the disclosed systems and methods.

FIG. 4 illustrates one exemplary embodiment of a simplified circuit schematic of AC-DC adapter system 202 that shows components of PFC stage 450 of primary side 108 which includes PFC bulk capacitor C6 (e.g., 180 µF), it being understood that any other suitable configuration of PFC circuitry and/or PFC bulk capacitance value may be employed. Also shown are circuit components of primary side fly-back stage 452 that are coupled as shown to primary side windings P1 of transformer 112. A first set of secondary side windings S1 of transformer 112 may be provided that are coupled to supply power to the illustrated exemplary components of main output circuitry 462 of AC-DC adapter system 202. A second set of secondary side sense windings S2 are provided as shown that are coupled to OVP2 detection circuitry 203 as shown. OVP2 detection circuitry 203 may in one embodiment include an OVP sense capacitor C501 that is coupled in parallel with secondary side sense windings S2 as shown such that current induced onto sense windings S2 from current flow through primary windings P1 causes charge to be stored onto sense capacitor C501. Because voltage (Vo) of the charge stored on sense capacitor C501 is proportional to the voltage on PFC bulk capacitor C8, voltage on sense capacitor C501 may be monitored or otherwise employed to sense overvoltage conditions of PFC bulk capacitor C8, e.g., when voltage on sense capacitor C501 exceeds an OVP trigger voltage threshold that corresponds to an OVP voltage threshold of PFC bulk capacitor C8 as explained further below. In this exemplary embodiment, OVP2 detection circuitry 203 may also include, for example, rectifier, comparator IC, transistors, resistors and ceramic capacitor circuit components that are coupled to activate optocoupler 204 to transmit OVP control signal 208 to controller 105 when voltage on sense capacitor C501 exceeds an OVP trigger voltage threshold.

Still referring to the exemplary embodiment of FIG. 4, following is a description of one embodiment of operation of circuitry AC-DC adapter system 202 as it may operate with OVP2 detection circuitry 203 while AC-DC adapter system is operating in AC "ON" condition under stable operating status. In the fly-back converter stage 452, when the main switch Q1 of primary side 108 is turned on, energy will be stored in the transformer 112 and is not transferred to secondary side 210 due to presence of main output rectify diode pole D1 that blocks energy delivery through auxiliary winding of transformer 112. At this time, output rectify diode D502 of OVP2 detection circuitry 203 turns on because transformer winding pole is forwarding and creating voltage to turn D502 turn on and then creates DC voltage (Vo) on voltage sense capacitor C501 according to the following equation:

Vo(C501)=(PFC voltage/NP)*NS(aux)

where: NP=number of primary windings (P1) of the transformer 112.
NS=number of auxiliary or detection secondary windings (S2) of the transformer 112

For example, in a case where number of primary windings (P1) is 32, and the number of secondary windings (S2) is 1, then $V_{C501}=V_{C6}*32$.

During periods of time that transformer 112 is turned off, when main switch Q1 is turned off, the energy will be released to secondary side through transformer 112 because the main output rectify diode D1 is turned on but at this time rectify diode D502 is turned off due to transformer pole.

It also will be understood that in other embodiments, auxiliary primary windings of transformer 112 may alternatively be provided and inductively coupled to a set of secondary side sense windings S2, but that in any case voltage/current of each winding of transformer may be configured to reflect proportionally by turn ratio design.

In the event that voltage on PFC bulk capacitor C8 goes into high voltage condition (i.e., exceeding maximum voltage threshold), voltage on secondary side sense capacitor C501 of OVP2 detection circuitry 203 will accordingly follow an increase in PFC bulk capacitor voltage. In the illustrated embodiment, real time voltage value on sense resistor R502 of OVP2 detection circuitry 203 is at least partially based on real time C501 voltage according to the following relationship:

$$V_{R502} = V_{C501} \times \frac{R_{502}}{R_{501} + R_{502}}$$

When the R502 voltage reaches a predetermined trigger threshold voltage value ($V_{ref-IC500}$), OVP control signal 208 is sent from detection circuitry 203 to controller 105 which in turn responds to this signal by turning off both PFC functions of stages 450 according to the following circuit relationships:

If $V_{R502} \geq V_{ref-IC500}$, TL431 will turn on. At this time, $V_{R507}$ is in low level and Q501 turns off. Then, $V_{C504}$ becomes high voltage and Q502 turns on. Photo coupler 114 turns on.

If $V_{R502} < V_{ref-IC500}$, TL431 turns off. $V_{R507}$ is in high level and Q501 turns on. Then, $V_{C504}$ becomes low voltage and Q502 turns off. Photo coupler also 114 turns off, too.

When photo coupler (PC500) turns on, $V_{CE-PC500} < V_{prot(LATCH)}$, IC will latch-off.

In one exemplary embodiment, detection circuitry 203 may be configured to delay for a set period of time before providing OVP control signal 208 to controller 105 after the predetermined trigger threshold voltage value has been detected to be exceeded.

Figure 5:
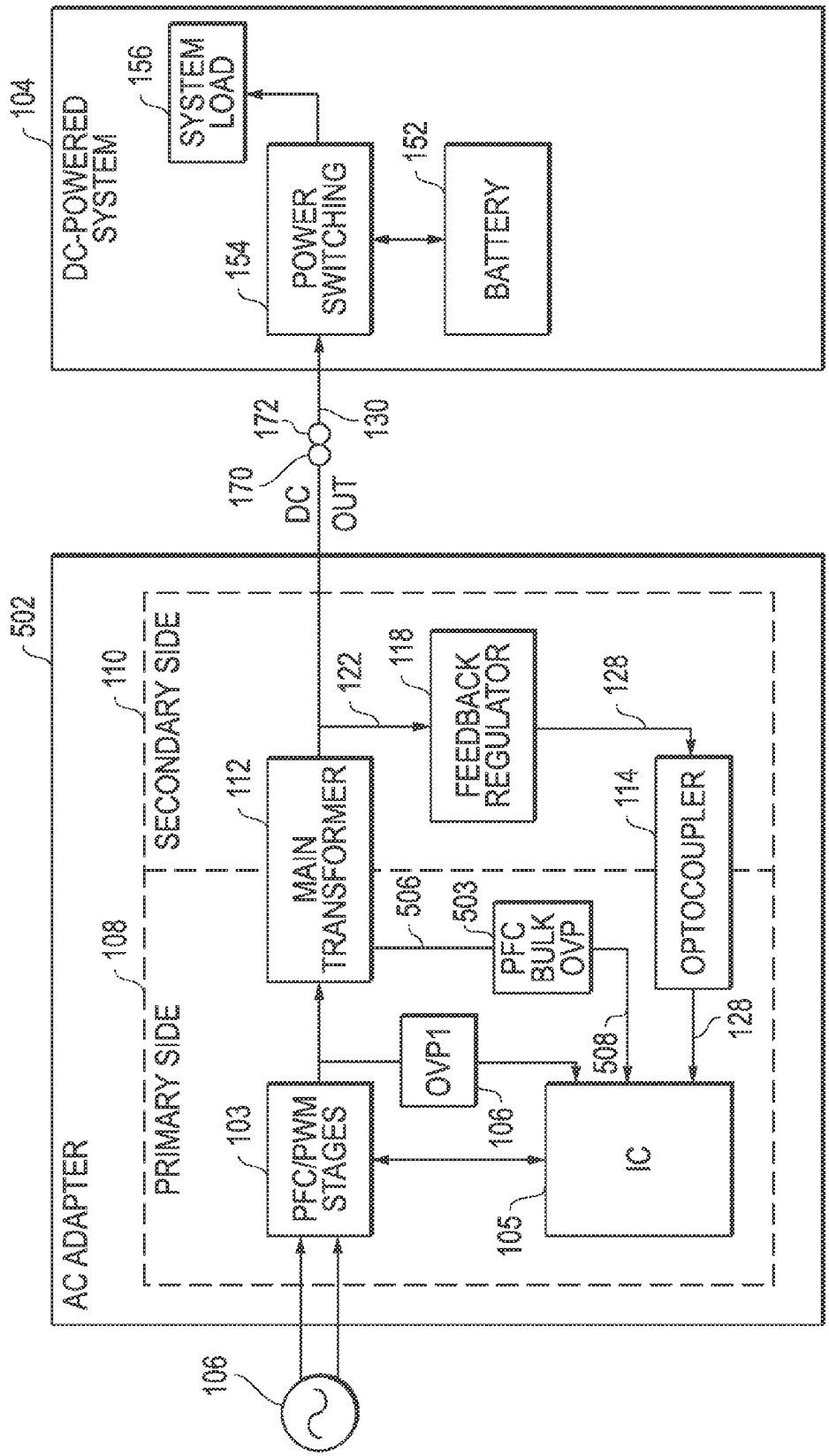
FIG. 5 is a block diagram illustrating a DC-powered information handling system coupled to a PSU according to one exemplary embodiment of the disclosed systems and methods.

FIG. 5 illustrates a DC-powered information handling system 104 that is coupled by a DC power connection 130 to a PSU configured as an AC-DC adapter system 502 according to another exemplary embodiment. In the embodiment of FIG. 5, AC-DC adapter 502 is configured similarly to AC-DC adapter 202 of FIGS. 2-4, with an optional first resistive overvoltage protection feedback path (OVP1) 106. However, in this embodiment a second and inductive overvoltage protection feedback path (OVP2) including OVP2 detection circuitry 503 is provided on the primary side of AC-DC adapter system 502 to allow controller 105 (e.g., PFC/PWM controller or PWM controller) to monitor voltage of PFC/PWM stage 105 even when OVP1 fails. As with the embodiment of FIGS. 2-4, it will be understood that in other PSU embodiments one or more inductive overvoltage protection feedback path/s may be similarly provided without the presence of a resistive OVP path, and/or that an inductive OVP path may configured as the first overvoltage protection path with a resistive OVP path configured as a secondary (or backup) overvoltage protection path.

In the exemplary embodiment of FIG. 5, detection circuitry 503 of OVP2 is inductively by a primary side sense winding that is coupled to the primary winding side of PSU transformer 112. In this embodiment, OVP2 detection circuitry 503 may thus sense voltage on the primary side sense winding that is inductively created from current on primary side winding/s of transformer 112, and therefore that is indicative of (e.g., proportional to) voltage of PFC/PWM stage 105 and on the primary side windings of transformer 112. OVP2 detection circuitry 503 may be further configured to provide an electrical or other suitable type of OVP control signal 208 to controller 105 when voltage monitored at the primary side sense winding is detected by OVP2 circuitry 203 to exceed a trigger voltage threshold value, e.g., of about 2.75V volts or any other voltage threshold depending on the relative operating voltage range of PFC/PWM stage 105 and the ratio of windings between primary windings of transformer 112 and sense windings coupled to OVP2 detection circuitry 503. As with secondary side OVP2 circuitry 203, primary side OVP2 detection circuitry 503 may be implemented using any suitable analog and/or digital circuitry configuration that is suitable for monitoring a voltage representative of PFC bulk capacitor voltage, to compare this monitored voltage to a trigger voltage threshold value, and to provide an OVP control signal 508 when the monitored voltage exceeds the trigger voltage threshold value.

Upon receipt of OVP control signal 508, controller 105 may be configured to react in a similar manner as described in relation to the embodiment of FIGS. 2-4, e.g., by immediately turning off both PFC/PWM functions of stages 103 to prevent damage to the PFC bulk capacitor. As with OVP1 circuitry 106, during normal operation the trigger voltage value for OVP2 shutdown may be set lower than the breakdown voltage of the PFC bulk capacitor. When the OVP2 trigger voltage threshold is exceeded, controller 105 may be configured to cause the AC-DC adapter system 502 to shut down and go into latch mode. It will be understood that in other embodiments, it is possible that a PSU processing device (e.g., such as controller 105) may be configured to directly monitor voltage received from a primary side inductive OVP feedback path, e.g., without the presence of a separate OVP detection circuitry 503.

Figure 6:
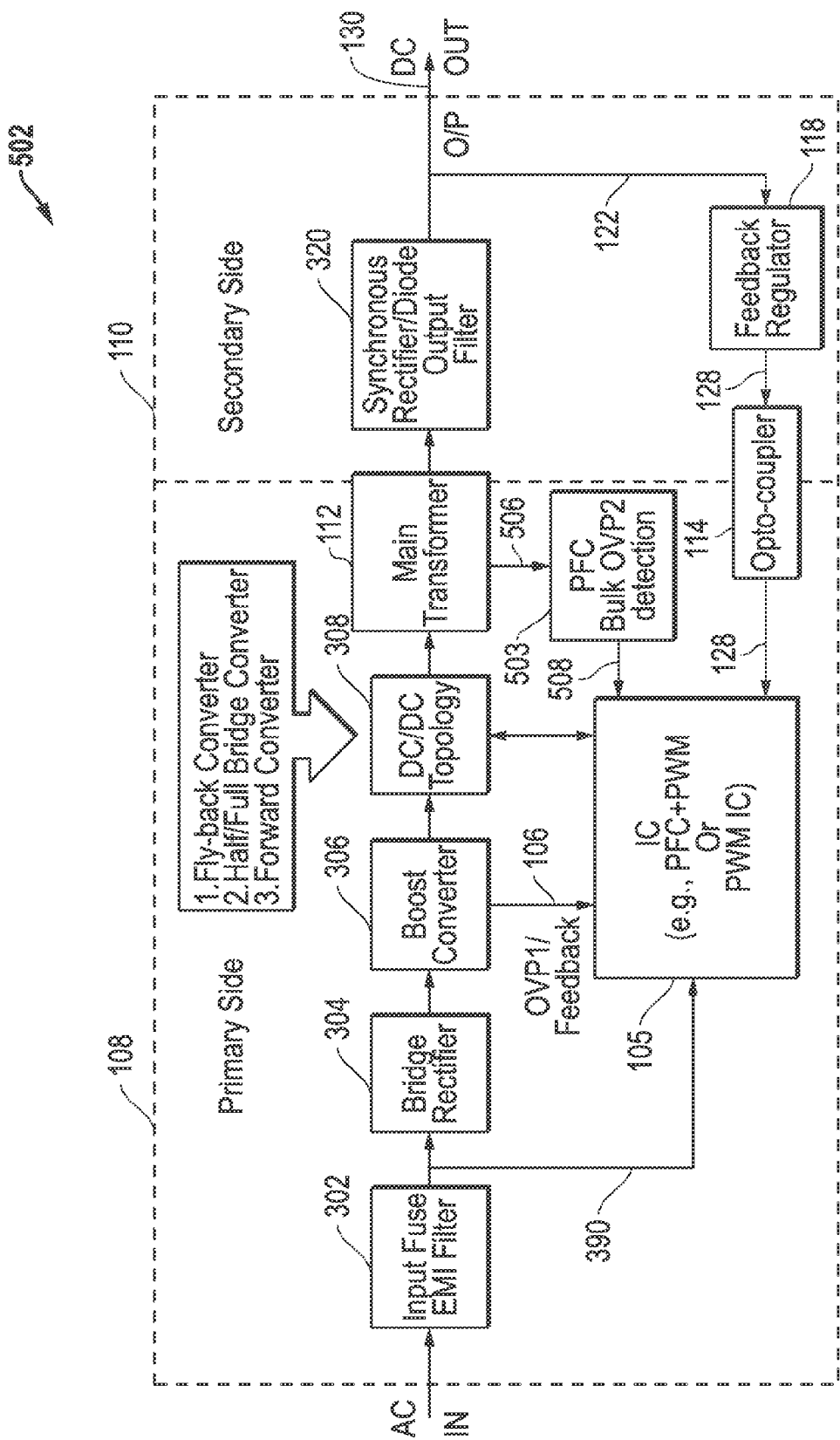
FIG. 6 is a block diagram illustrating a PSU according to one exemplary embodiment of the disclosed systems and methods.

FIG. 6 illustrates a block diagram of one exemplary embodiment of AC-DC adapter system 502 as it may be configured with a primary side inductive OVP2 circuitry 203 such as illustrated in FIG. 5. As shown in FIG. 6, primary side 108 of AC-DC adapter system 502 includes a number of similar PSU components as AC-DC adapter system 202 of FIG. 3, including resistive OVP1 path 106 from boost converter 306 to controller 105. Secondary side 110 of AC-DC adapter system 502 also includes a number of similar PSU components as AC-DC adapter system 202 of FIG. 3, including feedback regulator circuitry 118. However, as shown in FIG. 6 overvoltage protection (OVP2) detection circuitry 503 is coupled to primary side sense windings within main transformer 112 via voltage sensing path 506. As previously described, OVP2 detection circuitry 503 may be configured to inductively sense voltage via voltage sensing path 506 that is indicative of primary side PFC bulk capacitor voltage within boost converter 306 using primary side sense windings that are inductively coupled to primary side windings of transformer 112. OVP2 detection circuitry 503 may be further configured to provide suitable OVP control signal 508 to controller 105 when voltage monitored at the primary side sense windings of transformer 112 is detected by OVP2 detection circuitry 503 to exceed the trigger voltage threshold value. As previously described, controller 105 may be configured in one embodiment to immediately turn off both PFC/PWM functions of stages 103 upon receipt of the OVP control signal 508.

Figure 7:
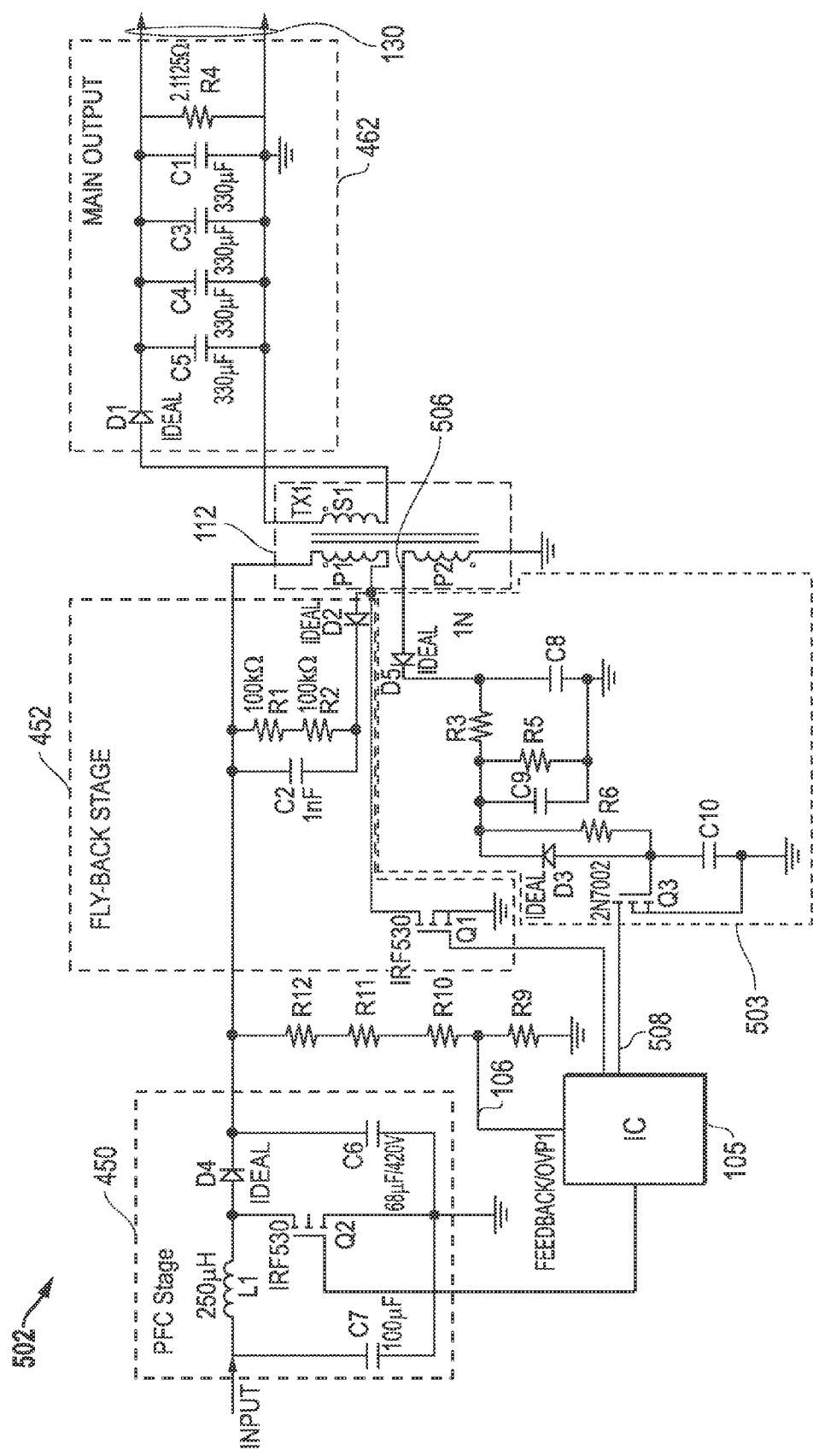
FIG. 7 is a simplified schematic illustrating a PSU according to one exemplary embodiment of the disclosed systems and methods.

FIG. 7 illustrates one exemplary embodiment of a simplified circuit schematic of AC-DC adapter system 502 that includes similar components as system 202 of FIG. 4, including PFC stage 450, controller 105, fly-back converter stage 452, transformer 112, and output stage 462. However, in this embodiment, a second set of primary side sense windings P2 are provided as shown that are coupled to OVP2 detection circuitry 503 as shown.

Still referring to the exemplary embodiment of FIG. 7, following is a description of one embodiment of operation of circuitry AC-DC adapter system 502 as it may operate with OVP2 detection circuitry 503 while AC-DC adapter system is operating in AC "ON" condition under stable operating status. In the fly-back converter stage 452, when the main switch Q1 of primary side 108 is turned on, energy will be stored in the transformer 112 and is not transferred to secondary side 210 due to presence of main output rectify diode pole D1 that blocks energy delivery through auxiliary winding of transformer 112. At this time, output rectify diode D502 of OVP2 detection circuitry 503 turns on because transformer winding pole is forwarding and creating voltage to turn D502 turn on and then creates DC voltage (Vo) on voltage sense capacitor C8 according to the following equation:

$$Vo(C8) = (PFC\ voltage/NP) * NP(aux)$$

where: NP=number of primary windings (P1) of the transformer 112.
NS=number of auxiliary or detection primary windings (P2) of the transformer 112

During periods of time that transformer 112 is turned off, when main switch Q1 is turned off, the energy will be released to secondary side through transformer 112 because the main output rectify diode D1 is turned on but at this time rectify diode D502 is turned off due to transformer pole.

In normal PSU operation, voltage on gate of OVP2 MOSFET Q3 remains below the threshold voltage to turn on Q3. However, in the event that voltage on PFC bulk capacitor C8 goes into high voltage condition (i.e., exceeding maximum voltage threshold), voltage on primary side sense capacitor C8 will accordingly follow an increase in PFC bulk capacitor voltage. When the voltage of sense capacitor C8 increases to a predetermined trigger threshold voltage value for turning on MOSFET Q3, Q3 turns on and grounds OVP2 path 508, which acts as an OVP2 control signal to controller 105, which in turn responds to this signal by turning off both PFC functions of stages 450 in a manner previously described for embodiment of FIG. 7. In one exemplary embodiment, detection circuitry 503 may be configured to delay for a set period of time before providing control signal 508 to controller 105 after the predetermined trigger threshold voltage value has been detected to be exceeded. Such a delay time may be provided, for example, by 100 uS or any other suitable greater or lesser value.

It will be understood that the particular circuit configurations illustrated in FIGS. 4 and 7 are exemplary only (including the exemplary number and type of circuit components, as well as interconnection topology of such components). Also only exemplary are the particular example voltage values and the particular example values of capacitance, inductance, and resistance described herein. In this regard, it will be understood that any alternate configuration of circuit components may employed that is suitable for implementing overvoltage protection of bulk capacitors employed in PSU circuitry and systems using one or more inductive overvoltage feedback protection paths. It will also be understood that one or more of the tasks, functions, or methodologies described herein (e.g., for PSU processing device 105) may be implemented, for example, as firmware or other computer program of instructions embodied in a non-transitory tangible computer readable medium that is executed by one or more processing devices such as CPU, controller, microcontroller, processor, microprocessor, FPGA, ASIC, or other suitable processing devices.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, a touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A switched mode power supply unit (PSU) system, comprising:
    transformer circuitry having a primary side winding and a secondary side winding;
    a primary side including at least one bulk capacitor configured to receive a power input and coupled to maintain an output voltage on the primary side winding;
    a secondary side including DC secondary side circuitry and the secondary side winding of the transformer, the DC secondary side circuitry being configured to receive power from the primary side through the transformer and to produce a DC power output therefrom;
    at least one PSU processing device coupled to control the primary side of the PSU to provide DC power to the primary side winding of the transformer; and
    at least one inductive overvoltage protection (OVP) feedback path coupled to the PSU processing device, the inductive OVP path being inductively coupled to the primary winding of the transformer to receive a voltage from the primary winding that is indicative of a real time voltage on the bulk capacitor.

2. The system of claim 1, where the primary side includes AC primary side switcher circuitry and the primary side winding of the transformer, the AC primary side switcher circuitry configured to receive the power input as an AC power input; where the DC secondary side circuitry is configured to receive power from the AC primary side switcher circuitry through the transformer and to produce the DC power output therefrom; and where the at least one PSU processing device is coupled to control the primary side switcher circuitry to provide DC power to the primary side winding of the transformer.

3. The system of claim 1, where the inductive OVP feedback path comprises a sense winding provided on the secondary side of the PSU system, the sense winding being inductively coupled to the primary winding of the transformer.

4. The system of claim 1, where primary side of the PSU includes the PSU processing device; and where the inductive OVP feedback path is coupled between the secondary side sense winding and the PSU processing device across an isolation barrier element.

5. The system of claim 1, where the inductive OVP feedback path comprises a sense winding provided on the primary side of the PSU system, the sense winding being inductively coupled to the primary winding of the transformer.

6. The system of claim 1, where the inductive OVP feedback path further comprises a sense winding inductively coupled to the primary winding of the transformer.

7. The system of claim 6, where the inductive OVP feedback path further comprises an OVP sense capacitor coupled in parallel with the sense winding.

8. The system of claim 7, where the inductive OVP feedback path further comprises OVP sense circuitry coupled between the sense winding and the PSU processing device, the OVP sense circuitry including the OVP sense capacitor; and
    where the OVP sense circuitry is configured to:
        compare an OVP trigger voltage threshold value to a value of voltage that is based on the real time voltage induced on the OVP sense capacitor from the primary winding of the transformer through the sense winding,
        provide an OVP control signal to the PSU processing device when the value of voltage that is based on the real time voltage induced on the OVP sense capacitor is sensed to exceed the OVP trigger voltage threshold value, and
        not provide the OVP control signal to the PSU processing device when the value of voltage that is based on the real time voltage induced on the OVP sense capacitor is sensed not to exceed the OVP trigger voltage threshold value; and
    where the PSU processing device is configured to control the primary side of the PSU to:
        provide DC power to the primary side winding of the transformer in the absence of an OVP control signal provided from the OVP sense circuitry, and
        stop providing DC power to the primary side winding of the transformer upon receipt of the OVP control signal provided from the OVP sense circuitry.

9. The system of claim 1, further comprising at least one resistive OVP feedback path coupled to the PSU processing device, the resistive OVP feedback path being electrically coupled to the bulk capacitor to receive a voltage indicative of the real time voltage on the bulk capacitor.

10. The system of claim 9, where the resistive OVP feedback path is configured to provide a voltage signal indicative of the real time voltage on the bulk capacitor to the PSU processing device; and where the PSU processing device is configured to control the primary side of the PSU to:
  provide DC power to the primary side winding of the transformer when the voltage signal is indicative of a real time voltage on the bulk capacitor that does not exceed a trigger voltage threshold value; and
  stop providing DC power to the primary side winding of the transformer when the voltage signal is indicative of a real time voltage on the bulk capacitor that exceeds a trigger voltage threshold value.

11. The system of claim 1, where the PSU is an AC-DC adapter system.

12. A DC-powered information handling system, comprising:
  a DC-powered system load; and
  an AC-DC adapter system having AC primary side switcher circuitry configured to receive an AC power input, and a DC secondary side that receives power from the AC primary side switcher circuitry to produce a DC power output;
  where the DC-powered information handling system is configured to be coupled by a DC power connection to receive DC power from the DC power output of the AC-DC adapter system; and
  where the AC-DC adapter system comprises:
    transformer circuitry having a primary side winding and a secondary side winding,
    a primary side including the AC primary side switcher circuitry and the primary side winding of the transformer, the AC primary side switcher circuitry configured to receive the AC power input and including at least one bulk capacitor coupled to maintain an output voltage on the primary side winding,
    a secondary side including the DC secondary side circuitry and the secondary side winding of the transformer, the DC secondary side circuitry being configured to receive power from the AC primary side switcher circuitry through the transformer and to produce the DC power output therefrom,
    at least one PSU processing device coupled to control the primary side switcher circuitry to provide DC power to the primary side winding of the transformer, and
    at least one inductive overvoltage protection (OVP) feedback path coupled to the PSU processing device, the inductive OVP path being inductively coupled to the primary winding of the transformer to receive a voltage from the primary winding that is indicative of a real time voltage on the bulk capacitor.

13. The system of claim 12, where the inductive OVP feedback path further comprises a sense winding inductively coupled to the primary winding of the transfoimer, the sense winding being provided on either the primary or secondary side of the AC-DC adapter system; where the inductive OVP feedback path further comprises an OVP sense capacitor coupled in parallel with the sense winding; and where the inductive OVP feedback path further comprises OVP sense circuitry coupled between the sense winding and the PSU processing device, the OVP sense circuitry including the OVP sense capacitor; and
  where the OVP sense circuitry is configured to:
    compare an OVP trigger voltage threshold value to a value of voltage that is based on the real time voltage induced on the OVP sense capacitor from the primary winding of the transformer through the sense winding,
    provide an OVP control signal to the PSU processing device when the value of voltage that is based on the real time voltage induced on the OVP sense capacitor is sensed to exceed the OVP trigger voltage threshold value, and
    not provide the OVP control signal to the PSU processing device when the value of voltage that is based on the real time voltage induced on the OVP sense capacitor is sensed not to exceed the OVP trigger voltage threshold value; and
  where the PSU processing device is configured to control the primary side switcher circuitry to:
    provide DC power to the primary side winding of the transformer in the absence of an OVP control signal provided from the OVP sense circuitry, and
    stop providing DC power to the primary side winding of the transformer upon receipt of the OVP control signal provided from the OVP sense circuitry.

14. The system of claim 12, where the DC-powered information handling system is a notebook computer.

15. A method of operating a switched-mode power supply unit (PSU) system including a primary side and a secondary side that are separated by a transformer, the method comprising:
  receiving a power input in the primary side of the PSU, the primary side of the PSU including a primary side winding of the transformer, and at least one bulk capacitor coupled to maintain an output voltage on the primary side winding;
  using the PSU processing device to control the primary side to provide DC power to the primary side winding of the transformer;
  receiving power in the secondary side of the PSU from the primary side of the PSU through the transformer, the secondary side of the PSU including a secondary side winding of the transformer and DC secondary side circuitry, the power being received in the secondary side of the PSU from the secondary winding of the transformer;
  producing a DC power output from the DC secondary side circuitry; and
  using at least one inductive overvoltage protection (OVP) feedback path to inductively receive a voltage from the primary winding of the transformer that is indicative of a real time voltage on the bulk capacitor and to provide a signal to the PSU processing device based at least in part on the value of the received voltage that is indicative of the real time voltage on the bulk capacitor.

16. The method of claim 15, where the primary side of the PSU further comprises AC primary side switcher circuitry; and where the method further comprises:
  receiving the power input as an AC power input in the AC primary side switcher circuitry;
  using the PSU processing device to control the primary side switcher circuitry to provide DC power to the primary side winding of the transformer; and
  receiving the power in the secondary side of the PSU from the AC primary side switcher circuitry through the transformer.

17. The method of claim 15, where the inductive OVP feedback path comprises a sense winding provided on the secondary side of the PSU system; where the primary side of the PSU includes the PSU processing device; and where the method further comprises:

using the sense winding to inductively receive the voltage from the primary winding of the transformer that is indicative of a real time voltage on the bulk capacitor; and providing an OVP control signal to the PSU processing device across an isolation barrier element.

18. The method of claim 17, where the inductive OVP feedback path further comprises an OVP sense capacitor coupled in parallel with the sense winding; where the inductive OVP feedback path further comprises OVP sense circuitry coupled between the sense winding and the PSU processing device, the OVP sense circuitry including the OVP sense capacitor; and where the method further comprises:

using the OVP sense circuitry to:
compare an OVP trigger voltage threshold value to a value of voltage that is based on the real time voltage induced on the OVP sense capacitor from the primary winding of the transformer through the sense winding,
provide an OVP control signal to the PSU processing device when the value of voltage that is based on the real time voltage induced on the OVP sense capacitor is sensed to exceed the OVP trigger voltage threshold value, and
not provide the OVP control signal to the PSU processing device when the value of voltage that is based on the real time voltage induced on the OVP sense capacitor is sensed not to exceed the OVP trigger voltage threshold value; and using the PSU processing device to control the primary side of the PSU to:
provide DC power to the primary side winding of the transformer in the absence of an OVP control signal provided from the OVP sense circuitry, and
stop providing DC power to the primary side winding of the transformer upon receipt of the OVP control signal provided from the OVP sense circuitry.

19. The method of claim 15, further comprising:
using at least one resistive OVP feedback path electrically coupled to the bulk capacitor to receive a voltage indicative of a real time voltage on the bulk capacitor;
using the resistive OVP feedback path to provide the voltage signal indicative of the real time voltage on the bulk capacitor to the PSU processing device; and
using the PSU processing device to control the primary side of the PSU to:
provide DC power to the primary side winding of the transformer when the voltage signal is indicative of a real time voltage on the bulk capacitor that does not exceed a trigger voltage threshold value, and
stop providing DC power to the primary side winding of the transformer when the voltage signal is indicative of a real time voltage on the bulk capacitor that exceeds a trigger voltage threshold value.

20. The method of claim 15, where the PSU is an AC-DC adapter system; and where the method further comprises providing the DC power output from the DC secondary side circuitry to a DC-powered information handling system across a DC power connection to power a DC-powered system load of the DC-powered information handling system.

21. The method of claim 20, where the DC-powered information handling system is a notebook computer.

22. The system of claim 1, where the inductive OVP feedback path and the PSU processing device are together configured to protect the primary side bulk capacitor by controlling the primary side of the PSU based on the received voltage from the primary winding of the transformer to limit the real time voltage on the bulk capacitor.

23. The system of claim 1, further comprising at least one resistive OVP feedback path coupled to the PSU processing device, the resistive OVP feedback path being electrically coupled to the bulk capacitor to receive a voltage indicative of the real time voltage on the bulk capacitor; where the inductive OVP feedback path comprises a sense winding provided on the secondary side of the PSU system, the sense winding being inductively coupled to the primary winding of the transformer; and where the inductive sense winding is provided on the same side of a printed circuit board (PCB) as are the primary side and secondary side transformer windings and that is opposite from a side of the PCB on which resistors of the resistive OVP feedback path are provided.

24. The system of claim 12, where the inductive OVP feedback path and the PSU processing device are together configured to protect the primary side bulk capacitor by controlling the primary side of the PSU based on the received voltage from the primary winding of the transformer to limit the real time voltage on the bulk capacitor.

25. The method of claim 15, further comprising using the inductive OVP feedback path and the PSU processing device to protect the primary side bulk capacitor by controlling the primary side of the PSU based on the received voltage from the primary winding of the transformer to limit the real time voltage on the bulk capacitor.

* * * * *